(12) United States Patent
Wakana et al.

(10) Patent No.: US 10,528,588 B2
(45) Date of Patent: Jan. 7, 2020

(54) PLATFORM SYSTEM, DATA CONVERSION METHOD AND COMPUTER-READABLE NON-TRANSITORY MEDIUM

(71) Applicant: FUJITSU LIMITED, Kawasaki-shi, Kanagawa (JP)

(72) Inventors: Shinichi Wakana, Musashino (JP); Tomohiko Maeda, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/018,390

(22) Filed: Jun. 26, 2018

(65) Prior Publication Data
US 2019/0012354 A1    Jan. 10, 2019

(30) Foreign Application Priority Data
Jul. 10, 2017    (JP) .................. 2017-134830

(51) Int. Cl.
 G06F 16/25    (2019.01)
 H04L 29/08    (2006.01)
 G06F 17/30    (2006.01)

(52) U.S. Cl.
 CPC ...... *G06F 16/258* (2019.01); *G06F 17/30569* (2013.01); *H04L 67/12* (2013.01); *H04L 67/2852* (2013.01)

(58) Field of Classification Search
 CPC ... G06F 16/258; G06Q 10/0639; H04L 67/12; H04L 67/2852

(Continued)

(56) References Cited

U.S. PATENT DOCUMENTS 6,195,708 B1    2/2001   Sugimoto
7,861,239 B2 *  12/2010  Mayfield ............. G06F 11/1433
                                              717/168

(Continued)

FOREIGN PATENT DOCUMENTS

EP    2 469 421 A1    6/2012
JP    7-73050          3/1995

(Continued)

OTHER PUBLICATIONS

Extended European Search Report dated Oct. 23, 2018 in corresponding European Patent Application No. 18180780.1, 10 pgs.

(Continued)

*Primary Examiner* — James E Springer
(74) *Attorney, Agent, or Firm* — Staas & Halsey LLP

(57) ABSTRACT

A platform system includes: a memory; and a processor coupled to the memory and the processor configured to execute a process, the process comprising: receiving data from a second platform when a first platform requires the second platform to send the data, the first platform being configured to output one or more data from data which the first platform has, the second platform being configured to output one or more data from data which the second platform has; and converting a data structure of the data into a data structure required by the first platform in accordance with a difference between a data structure regulated by the first platform and a data structure regulated by the second platform; and sending the data, of which the data structure is converted, to the first platform.

9 Claims, 19 Drawing Sheets

(58) Field of Classification Search
USPC .......................................................... 709/246
See application file for complete search history.

(56) References Cited

U.S. PATENT DOCUMENTS

| | | | |
|---|---|---|---|
| 2004/0254939 A1* | 12/2004 | Dettinger | G06F 16/2457 |
| 2005/0164704 A1 | 7/2005 | Winsor | |
| 2007/0067458 A1* | 3/2007 | Chand | G06F 16/258 |
| | | | 709/226 |
| 2008/0281849 A1* | 11/2008 | Mineno | G06F 16/256 |
| 2010/0057759 A1* | 3/2010 | Cotichini | G06F 16/2272 |
| | | | 707/E17.009 |
| 2011/0029546 A1* | 2/2011 | Mineno | G06F 16/258 |
| | | | 707/756 |
| 2014/0156638 A1 | 6/2014 | Joshi et al. | |
| 2015/0347472 A1* | 12/2015 | Gupta | G06F 16/282 |
| | | | 707/805 |
| 2015/0365492 A1* | 12/2015 | Kalan | G06Q 10/0637 |
| | | | 700/83 |
| 2015/0365550 A1 | 12/2015 | Ito | |
| 2016/0291563 A1* | 10/2016 | Kumar | H04L 41/0883 |

FOREIGN PATENT DOCUMENTS

| | | |
|---|---|---|
| JP | 2005-209194 | 8/2005 |
| JP | 2016-4318 | 1/2016 |

OTHER PUBLICATIONS

David Linthicum, "Enterprise Application Integration"; selected pages of Chapter 1 (Defining EAI); Chapter 2 (Data-Level EAI); Chapter 9 (RPCs, Messaging, and EAI); Chapter 18 (Message Brokers-The Preferred EAI Engine), Enterprise Application Integration [Addison-Wesley Information Technology Series], May 1, 2000, 70 pgs.

Wikipedia, "Federated database system", https://en.wikipedia.org/w/index.php?title=Federated_database_system&oldid=706581519, dated Feb. 24, 2016, retrieved Apr. 5, 2017, 6 pgs.

Wikipedia, "Schema matching", https://en.wikipedia.org/w/index.php?title=Schema_matching&oldid=787233453, dated Jun. 24, 2017, retrieved Oct. 12, 2018, 4 pgs.

* cited by examiner

FIG. 7A

|  | WORK MODEL | FACILITY MODEL | WORKER MODEL |
|---|---|---|---|
| OPERATION OBJECT | WORK PROCESS | FACILITY DEVICE | WORKER |
|  | WORK STANDARD | FACILITY PERFORMANCE | WORKER PERFORMANCE |
|  | WORK METHOD | FACILITY RECIPE | WORKER FORMATION |
|  |  | FACILITY MONITOR | FORMATION SUBJECT |
|  |  | FACILITY SPECIFICATION |  |

FIG. 7B

| NAME | WORK PROCESS | | |
|---|---|---|---|
| OUTLINE | WORK PROCESS IS DIVIDED PROCESSES OF PRODUCT PROCESS BY UNIT EXECUTED BY WORKSTATION. | | |

| No. | ITEM | EXPLANATION | KEY |
|---|---|---|---|
| 1 | WORK PROCESS | WORK PROCESS | PK |
| 2 | PRODUCT PROCESS | PRODUCT PROCESS | FK |
| 3 | WORK CENTER | WORK CENTER | FK |
| 4 | PROCESS NAME | WORK PROCESS NAME | |
| 5 | ITEM | EXPLANATION | FK |
| 6 | SERIAL NUMBER | SERIAL NUMBER | |
| 7 | CONTROL STANDARD | CONTROL STANDARD | |
| 8 | TEST METHOD | TEST METHOD | |
| 9 | RECORD METHOD | RECORD METHOD | |
| 10 | CONFIRM NUMBER | CONFIRM NUMBER | |
| 11 | CHANGE NUMBER | CHANGE NUMBER | |
| 12 | RELATED MATERIAL | RELATED MATERIAL | |
| 13 | APPLICATION | APPLICATION | |
| 14 | ENROLLED DATE | FIRST DATE OF ENROLLMENT | |
| 15 | DATE OF UPDATING | FINAL DATE OF ENROLLMENT | |
| 16 | INVALID FLAG | WHETHER OBJECT IS EFFECTIVE | |
| NOTES: | | | |

FIG. 12

| PF1 | | | | PF2 | | | | PF3 | | | | ... | PFN | | | |
|---|---|---|---|---|---|---|---|---|---|---|---|---|---|---|---|---|
| obj-1-1 | att-1-1-1 | att-1-1-2 | ... att-1-1-a | obj-2-1 | att-2-1-1 | ... | att-2-1-g | obj-3-1 | att-3-1-1 | att-3-1-2 | ... att-3-1-k | | obj-N-1 | att-N-1-1 | att-N-1-2 | ... att-N-1-x |
| obj-1-2 | att-1-2-1 | att-1-2-2 | ... att-1-2-b | obj-2-2 | att-2-2-1 | att-2-2-2 | ... att-2-2-h | obj-3-2 | att-3-2-1 | att-3-2-2 | ... att-3-2-l | | obj-N-2 | att-N-2-1 | att-N-2-2 | ... att-N-2-y |
| obj-1-P | att-1-P-1 | att-1-P-2 | ... att-1-P-c | obj-2-Q | att-2-Q-1 | att-2-Q-2 | ... att-2-Q-i | obj-3-R | att-3-R-1 | att-3-R-2 | ... att-3-R-m | | obj-N-S | att-N-S-1 | att-N-S-2 | ... att-N-S-z |

FIG. 13

| | | | | |
|---|---|---|---|---|
| OBJECT | obj-1-1 | obj-2-2 | obj-N-g | |
| | obj-2-3 | obj-N-1 | | |
| | ⋮ | ⋮ | | |
| | obj-H-5 | obj-j-3 | obj-K-e | obj-L-7 |
| ATTRIBUTE | att-1-2-1 | att-2-3-4 | att-3-5-1 | |
| | att-2-4-5 | att-3-1-6 | att-5-1-2 | att-L-3-1 |
| | ⋮ | ⋮ | | |
| | att-H-6-2 | att-J-6-3 | | |

FIG. 14

| No. | CONVERSION FORMULA |
|---|---|
| 1 | obj-1-2 = obj-2-3 + obj-2-5 |
| 2 | attr-1-3-2 = attr-2-5-2 - attr-2-5-1 |
| 3 | attr-1-5-6 = Σ ((attr-2-10-1<>"")*attr-2-10-3) : DESIGNATED TIME |
|  |  |

PLATFORM SYSTEM, DATA CONVERSION METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2017-134830, filed on Jul. 10, 2017, the entire contents of which are incorporated herein by reference.

FIELD

A certain aspect of embodiments described herein relates to a platform system, a data conversion method and a computer-readable non-transitory medium.

BACKGROUND

There is developed an integrated service (what is called a platform) for collecting data, storing the data and supplying the data on demand (for example, see Japanese Patent Application Publications No. 2005-209194, No. H07-73050 and No. 2016-4318).

SUMMARY

When the platform receives an instruction of data supply requirement from an application, the platform supplies data of its own to the application. However, with respect to the requirement of the application, the platform may lack data. In this case, the platform obtains data from another platform and adds the obtained data to its own data. However, each data structure of the platforms is not always the same as each other. And so, conversion of the data structures is required. In this case, when the conversion is required with respect to each application, the cost may increase.

According to an aspect of the present invention, there is provided a platform system including: a memory; and a processor coupled to the memory and the processor configured to execute a process, the process comprising: receiving data from a second platform when a first platform requires the second platform to send the data, the first platform being configured to output one or more data from data which the first platform has, the second platform being configured to output one or more data from data which the second platform has; and converting a data structure of the data into a data structure required by the first platform in accordance with a difference between a data structure regulated by the first platform and a data structure regulated by the second platform; and sending the data, of which the data structure is converted, to the first platform.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7A illustrates a profile;

FIG. 7B illustrates objects;

FIG. 12 illustrates data stored in a profile database;

FIG. 13 illustrates data stored in a name matching dictionary database;

FIG. 14 illustrates data stored in a difference dictionary database;

FIG. 15 illustrates a flowchart of operations in a case where a first platform receives a data supply requirement from an application or the like;

DESCRIPTION OF EMBODIMENTS

A description will be given of an outline of data exchange between platforms. A field of the data exchange is not limited. In the following embodiment, as an example, a description will be given of data exchange of a manufacturing technology.

Importance of a manufacturing technology is recognized worldwide. Therefore, political efforts and strategic efforts are progressed. Along the efforts, digitalization of data of manufacturing sites is progressed with use of IoT technology. On the basis of the progress, importance of an integrated service (what is called a platform) for collecting data for supporting OT (Operation Technology) of manufacturing sites with ICT, storing the data, and supplying the data in accordance with a requirement is recognized. And so, many companies start supplying of a platform.

A highly advanced usage of data is discussed about using the data for a single purpose but also combining the data and creating a new value of the data, in a production technology. In a business, quality or quantity of data which a platform has may be a resource for achieving competitive advantage. Having data means that the platform can supply the data to an application or a service (hereinafter referred to as an application or the like) that use the platform and means that the data is not always stored in a database in the platform.

Figure 1:
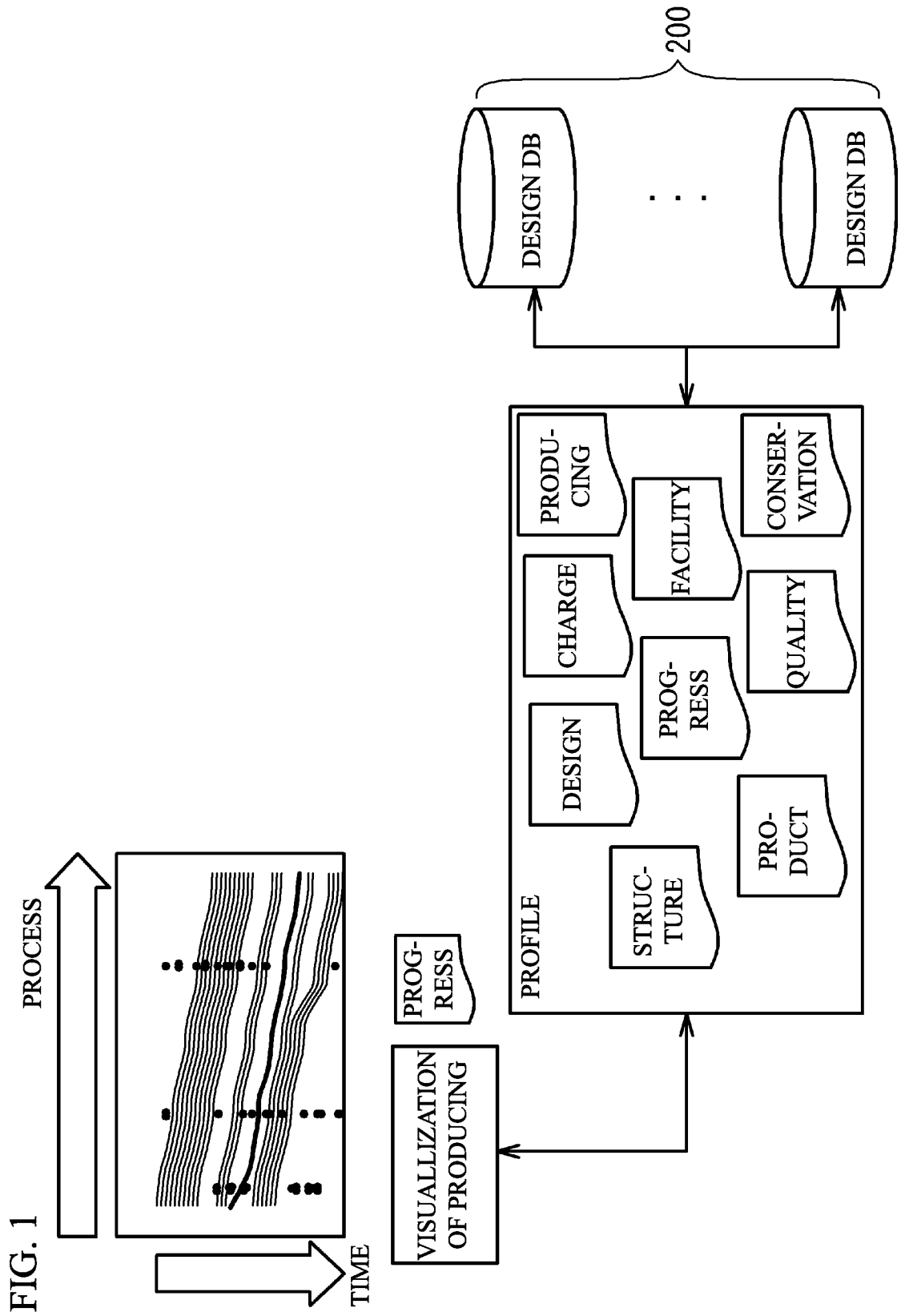
FIG. 1 illustrates a platform of a manufacturing technology.

FIG. 1 illustrates a platform of a manufacturing technology. As illustrated in FIG. 1, in the manufacturing technology, a database 200 stores data of a design, data regarding actual producing and so on. When the platform receives an instruction of data supply requirement from an application or the like, the platform supplies the required data to the application or the like with use of the data stored in the database 200, after comparing the profile required by the application with a profile which the platform can supply and confirming that the platform can supply the required data. The profile is a set of objects treated by the platform. In the example of FIG. 1, the profile includes objects such as product information, design information or progress information. For example, the platform browses the progress information from the profile and supplies the progress information to the application or the like, for visualization of the producing state by the application or the like. The application or the like makes a display device show visualized information of the progress information.

Figure 2:
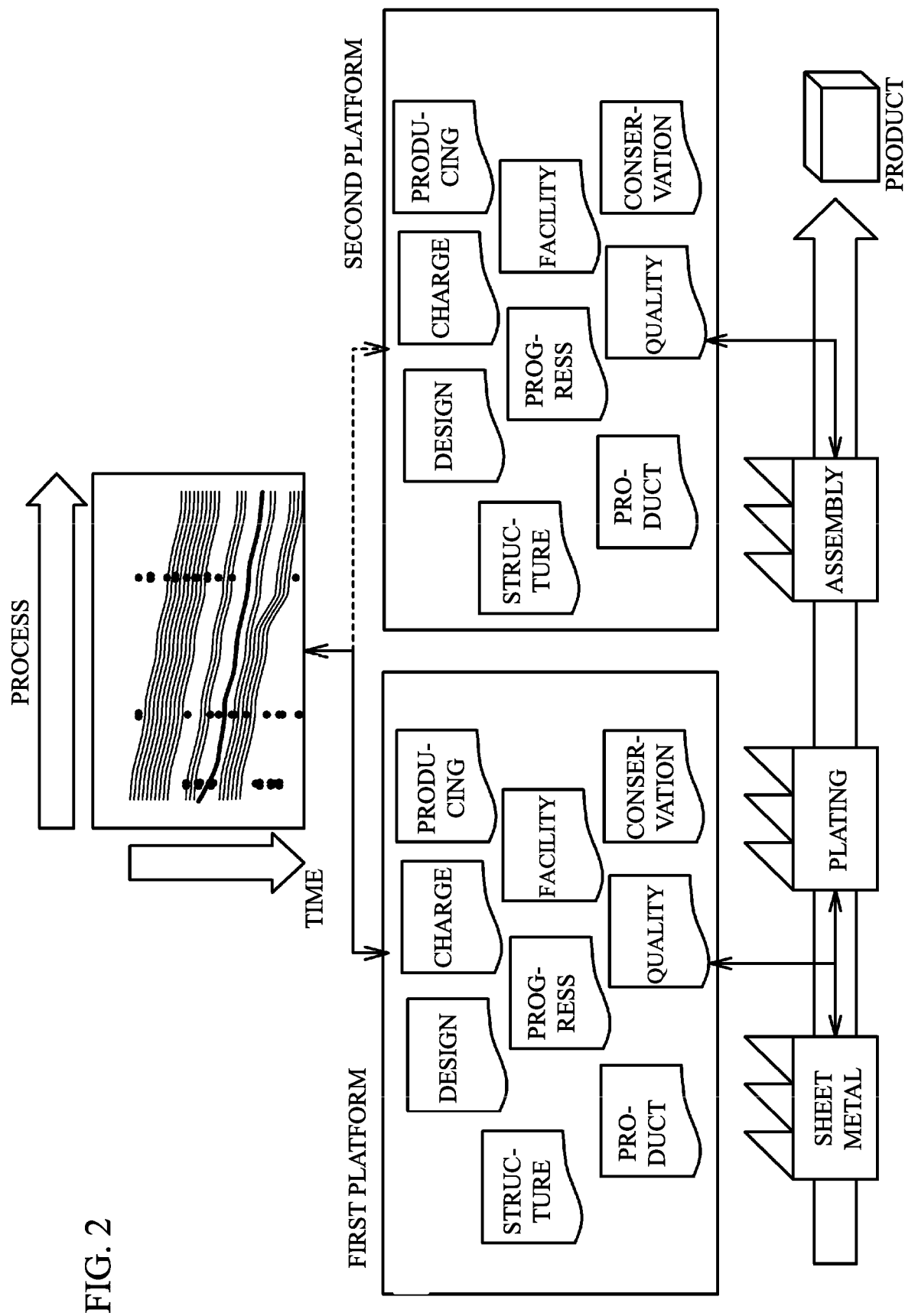
FIG. 2 illustrates a platform of a manufacturing technology.

FIG. 2 illustrates a case where two different platforms are used in a single production line. As illustrated in FIG. 2, when a first platform receives an instruction of data supply requirement from an application or the like, the first platform supplies objects of a sheet metal process and a plating process of the production line to the application or the like. When a second platform receives an instruction of data supply requirement from the application or the like, the second platform supplies objects of an assembly process after the plating process of the production line to the application or the like.

A description will be given of a case where the first platform browses the progress information of a profile of its own and progress information which the second platform has, and supplies an object to an application or the like, in accordance with an instruction of data supply requirement from the application or the like. As illustrated in FIG. 2, the profile of the first platform includes progress information as an object. On the other hand, the profile of the second platform does not include the progress information as an object. However, the profile of the second platform includes result information that is similar to the progress information. A part of a data structure of the result information is the same as a part of a data structure of the progress information. And, a part of the data structure of the result information is different from a part of the data structure of the progress information. Here, the data structure is such as a data item, an order, a data format or the like.

In this case, it is necessary to harmonize result information with a data structure of progress information. In this case, it is necessary to individually develop each application or the like. Therefore, the cost for data distribution may be high. And so, a description will be given of data conversion for converting data structure between platforms, in the following embodiments.

[First Embodiment]

Figure 3:
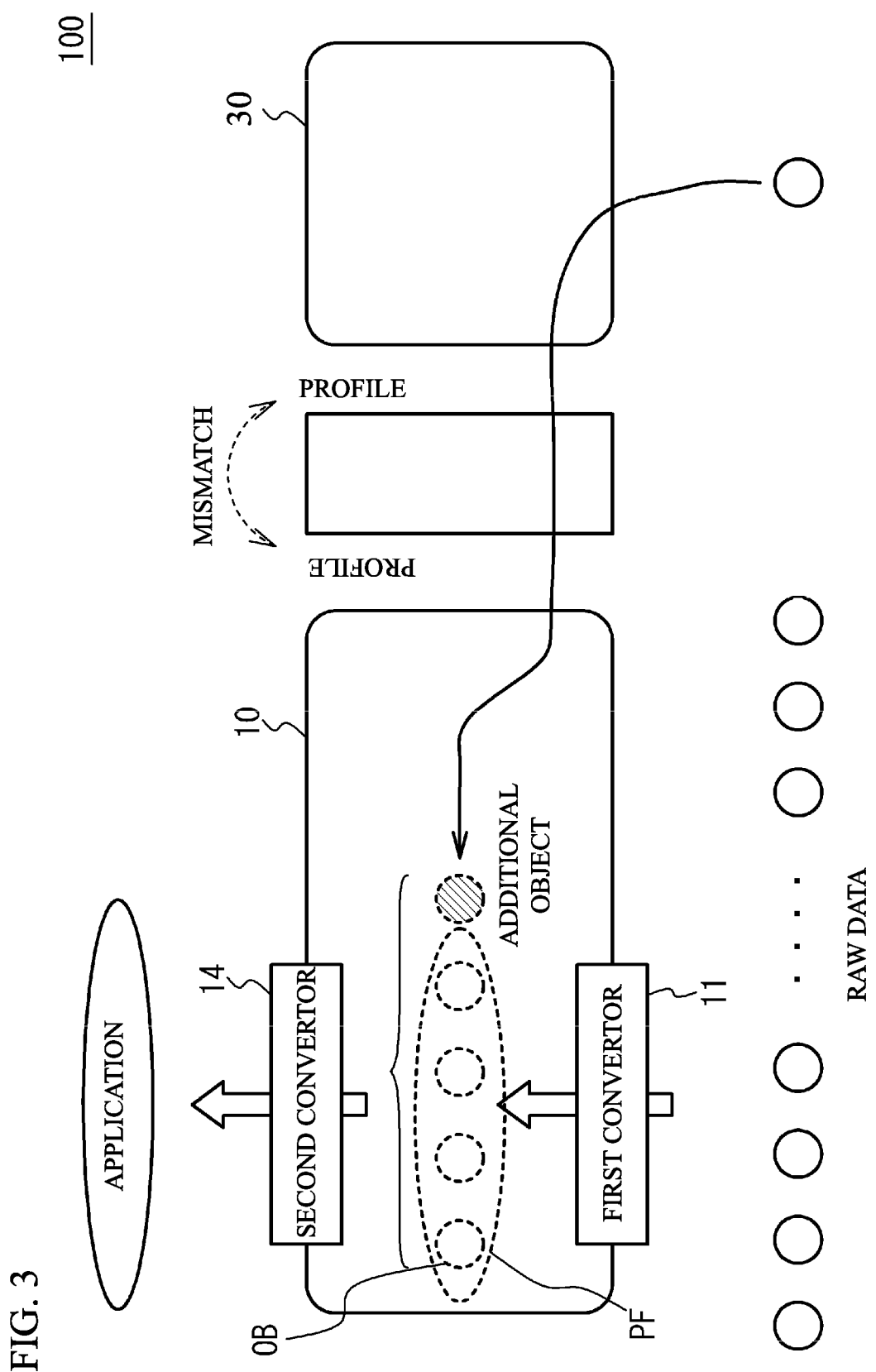
FIG. 3 illustrates an overall structure of a platform system in accordance with a first embodiment.
Figure 4:
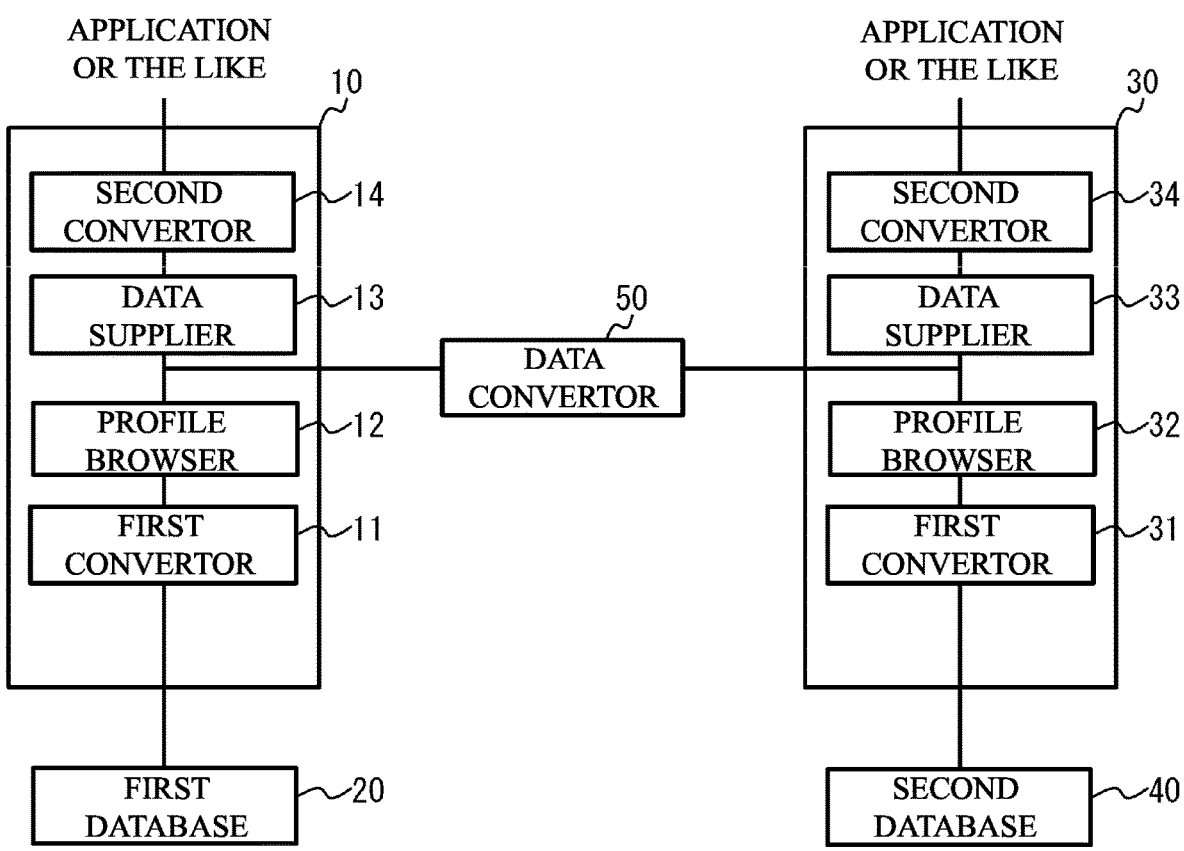
FIG. 4 illustrates a function diagram of a platform system.

FIG. 3 illustrates an overall structure of a platform system 100 in accordance with a first embodiment. FIG. 4 illustrates a function diagram of the platform system 100. As an example, when the platform system 100 receives an instruction of data supply requirement from an application or the like, the platform system 100 supplies data of a manufacturing technology to the application or the like.

As illustrated in FIG. 3 and FIG. 4, the platform system 100 includes a first platform 10, a first database 20, a second platform 30, a second database 40, a data convertor 50 and so on. The first platform 10 includes a first convertor 11, a profile browser 12, a data supplier 13, a second convertor 14 and so on. The second platform 30 includes a first convertor 31, a profile browser 32, a data supplier 33, a second convertor 34 and so on.

The first database 20 stores data relating to a design, data relating to actual producing, and so on. For example, the first database 20 stores data of a sheet metal process and a data of plating process. The second database 40 stores data relating to a design, data relating to actual producing and so on. For example, the second database 40 stores data of an assembly process.

When the profile browser 12 receives an instruction of data supply requirement from an application or the like, the profile browser 12 browses a profile of the first platform 10.

In this case, the first convertor 11 receives one or more objects needed for a required profile from the data stored in the first database 20 and generates a data set corresponding to the required profile. However, with respect to the profile which the application or the like requires, the data set may lack an object. In this case, it is necessary to add an object to the data set from the second platform 30.

Figure 5:
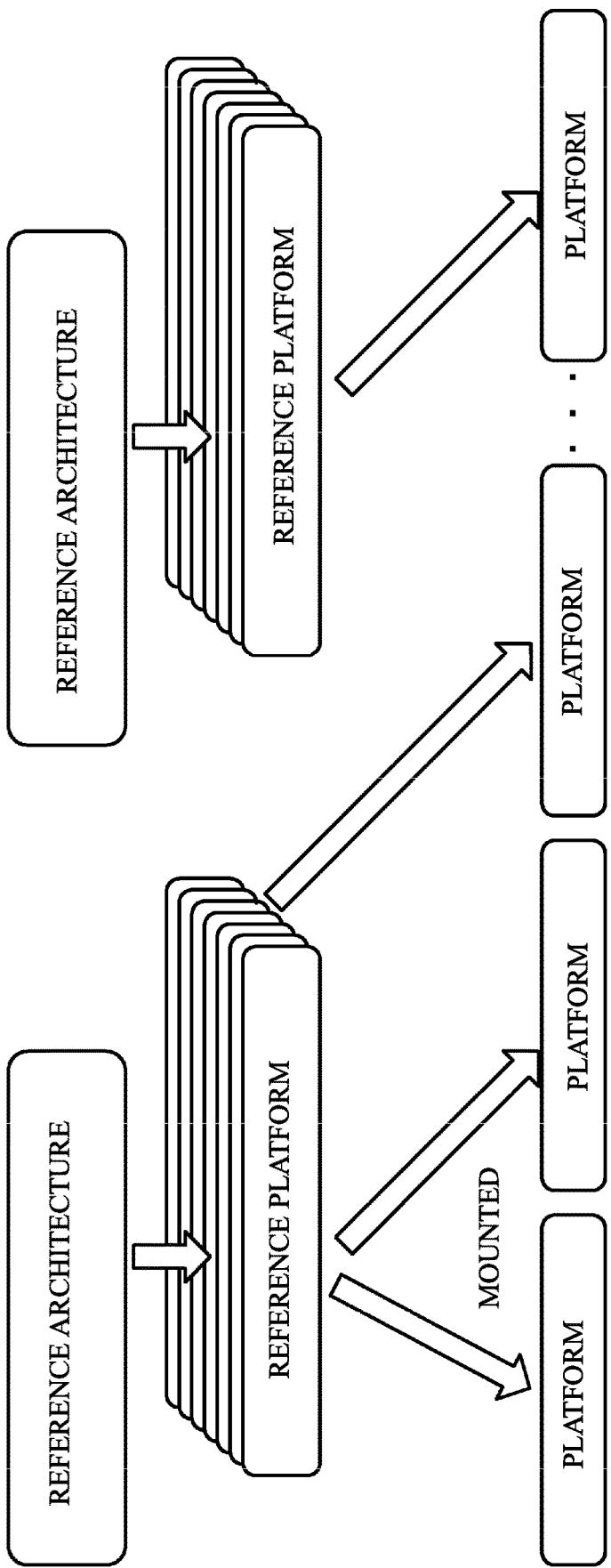
FIG. 5 illustrates a layer structure of a platform during a profile browsing.

FIG. 5 illustrates a layer structure of the platform during the profile browsing. The platform browses a reference platform during architecture of the layer structure. The reference platform browses the reference architecture. The reference platform and the platform have a profile for treating data. It is possible to browse the profile from outside. The profile of the reference platform is defined as a subset of a profile which the reference architecture defines. The profile of the platform is defined as a subset of the profile of the reference platform.

Figure 6:
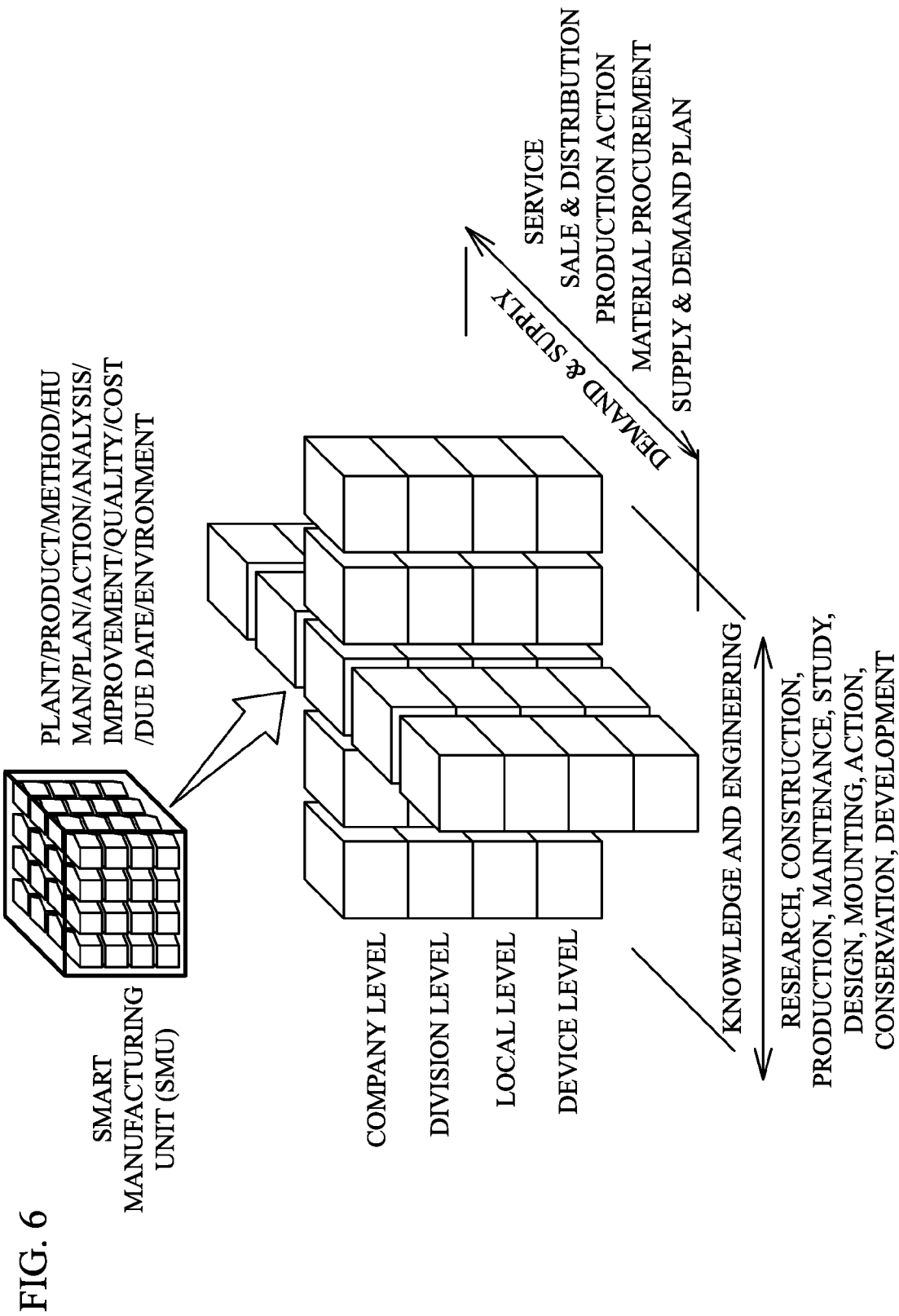
FIG. 6 illustrates a reference architecture.

FIG. 6 illustrates a reference architecture proposed by a general incorporated foundation "industrial value chain initiative". As illustrated in FIG. 6, the reference architecture is a data structure defining a profile. The reference architecture generates a model of an object phenomenon and defines a necessary profile.

FIG. 7A illustrates a part of a profile expected by a PSLX forum of APS driving mechanism of specific non-profit juridical organization. As illustrated in FIG. 7A, the profile is a set of objects treated by the platform (a part surrounded by a broken line of FIG. 7A). In the example of FIG. 7A, a set of business object is illustrated as a profile. FIG. 7B illustrates objects. The objects are data models defined in accordance with a usage thereof. In the example of FIG. 7B, a data model "work process" is illustrated.

Figure 8:
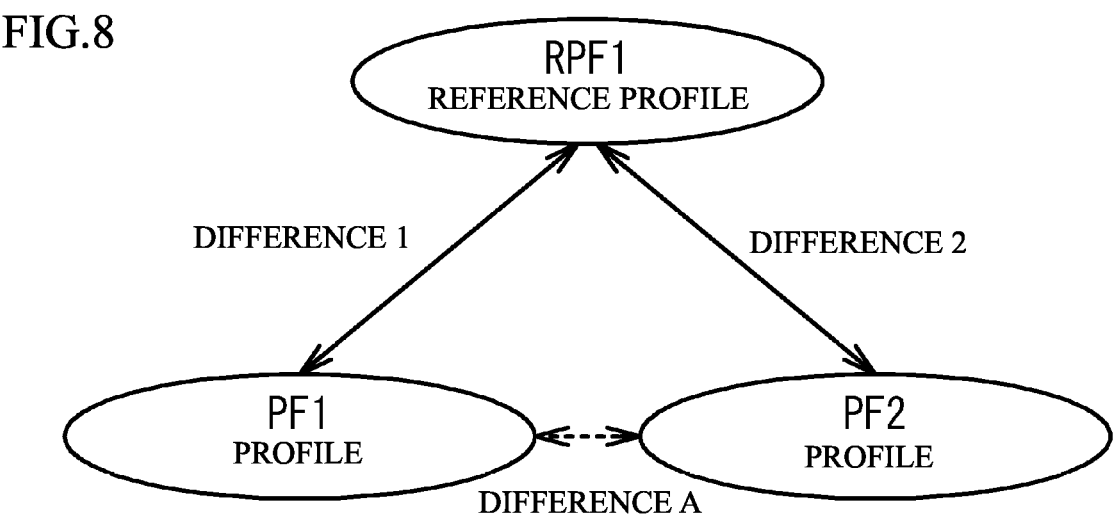
FIG. 8 illustrates browsing of a profile.

FIG. 8 illustrates is a case where a reference platform browsed by the profile browser 12 of the first platform 10 is the same as a reference platform browsed by the profile browser 32 of the second platform 30. In this case, for example, a difference 1 occurs between a data format PF1 of the profile required by the profile browser 12 and a data format RPF1 of the reference profile which the reference platform has. For example a difference 2 occurs between the data format PF2 of the profile required by the profile browser 32 and the data format RPF1. Therefore, a difference A occurs between the data format PF1 and the data format PF2. In this case, it is possible to generate the difference A from two stages of the difference 1 and the difference 2.

Figure 9:
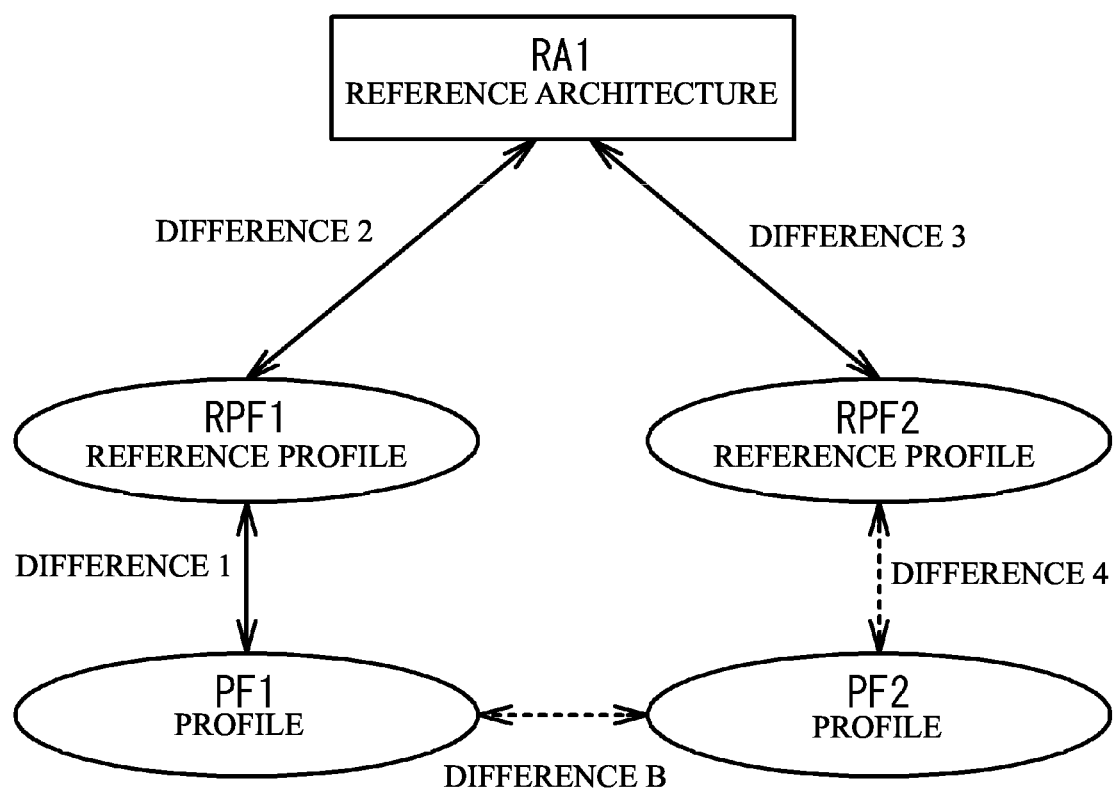
FIG. 9 illustrates browsing of a profile.

FIG. 9 illustrates a case where the profile browser 12 browses the first reference platform and the profile browser 32 browses the second reference platform that is different from the first reference platform. However, the first reference platform and the second reference platform browse the same reference architecture. In this case, the difference 1 occurs between the data format PF1 and the data format RPF1 of the profile of the first reference platform. The difference 2 occurs between the RPF1 and the data format RA1 of the profile of the reference architecture. A difference 3 occurs between the data format RPF2 of the second reference profile and the RA1. A difference 4 occurs between the data format PF2 and the data format RPF2. As a result, a difference B occurs between the data format PF1 and the data format PF2. In this case, it is possible to generate the difference B from 4 stages of the difference 1 to the difference 4.

Figure 10:
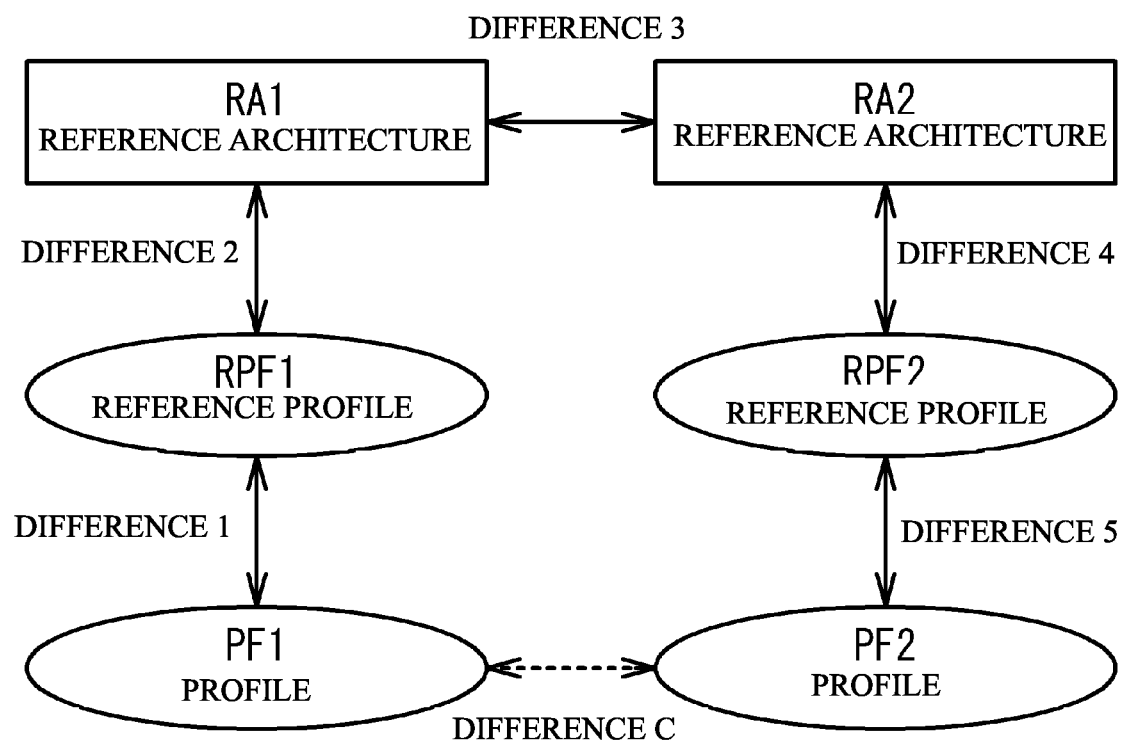
FIG. 10 illustrates browsing of a profile.

FIG. 10 illustrates a case where the profile browser 12 browses the first reference platform, the profile browser 32 browses the second reference platform, the first reference platform browses the first reference architecture, and the second reference platform browses the second reference architecture that is different from the first reference architecture. In this case, the difference 1 occurs between the data format PF1 and the data format RPF1. The difference 2 occurs between the data format RPF1 and the data format RA1 of the profile of the first reference architecture. The difference 3 occurs between the data format RA1 and the data format RA2 of the profile of the second reference architecture. The difference 4 occurs between the data format RA2 and the data format RPF2. A difference 5 occurs between the data format PF2 and the data format RPF2. As a result, a difference C occurs between the data format PF1 and the data format PF2. In this case, it is possible to generate the difference C from five stages of the difference 1 to the difference 5.

Figure 11:
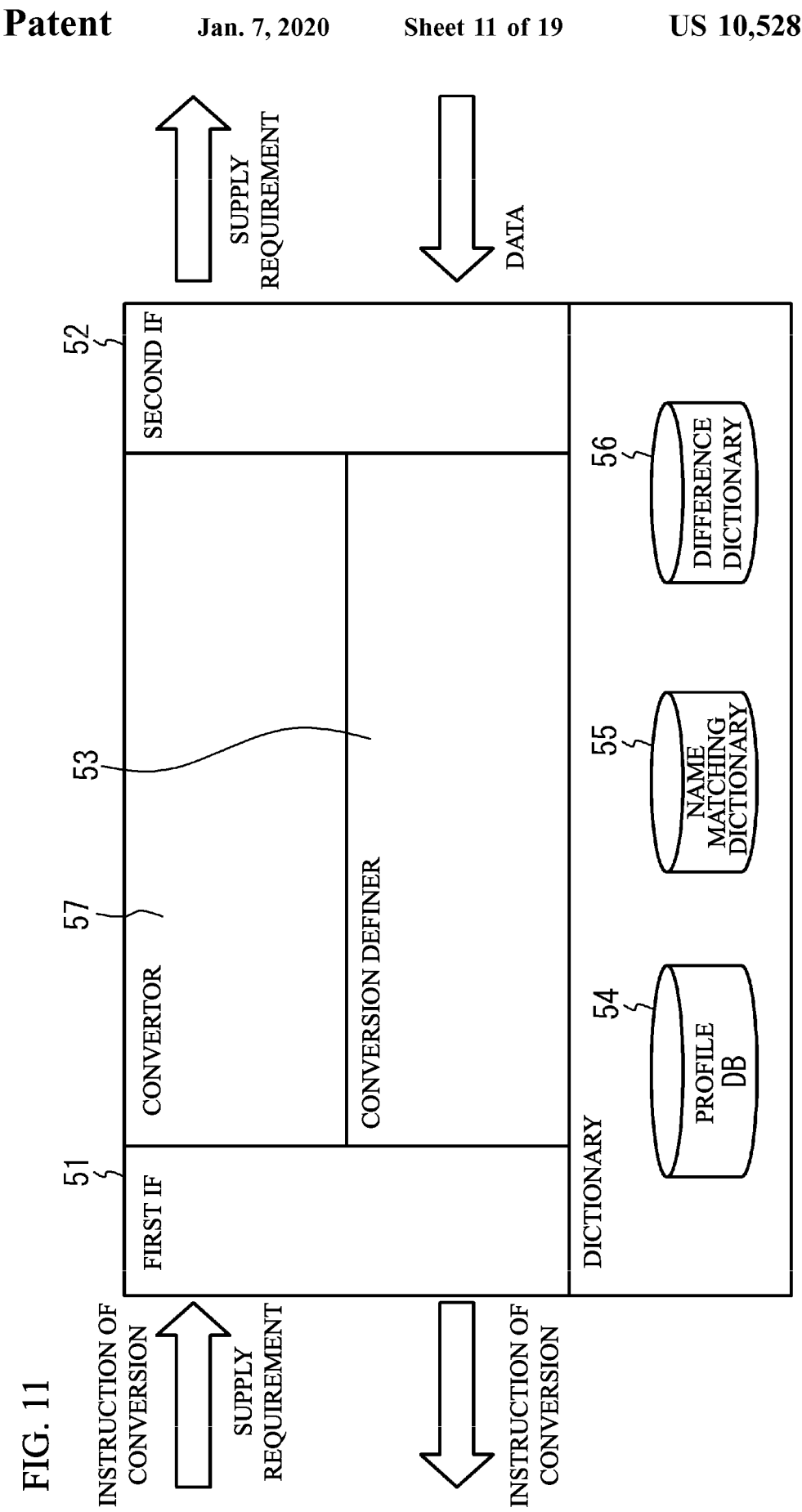
FIG. 11 illustrates a function block diagram of details of a data convertor.

FIG. 11 illustrates a function block diagram of details of the data convertor 50. As illustrated in FIG. 11, the data convertor 50 acts as a first interface 51, a second interface 52, a conversion definer 53, a profile database 54, a name matching dictionary database 55, a difference dictionary database 56, a convertor 57 and so on.

The first interface 51 is an interface toward a data requirement side. In the embodiment, the first interface 51 receives a requirement of data supply from the first platform 10 and receives an instruction of conversion. The second interface 52 sends a requirement of data supply to the second platform 30 and receives data from the second platform 30.

The conversion definer 53 starts when receiving an instruction of conversion. The conversion definer 53 read a dictionary from the profile database 54, the name matching dictionary database 55 and the difference dictionary database 56. When there is no definition in the difference dictionary database 56, the conversion definer 53 defines a data conversion method. The convertor 57 starts when receiving a supply requirement. The convertor 57 uses a conversion method defined by the conversion definer 53, converts an object and supplies the converted object to the first platform 10.

FIG. 12 illustrates the profile stored in the profile database 54. As illustrated in FIG. 12, the profile database 54 stores a profile of each platform. "PF" indicates a platform. "N" indicates the number of platforms which the data convertor 50 can access. "obj" indicates an object. The number added to "obj" indicates "obj-platform number-object number". "P", "Q" and "R" indicate the object number defined by the platform. "att" indicates an attribute. The number added to "att" indicates "att-platform number-object number-attribute number". "a" to "z" indicate the number of attributes structuring the object. In the example of FIG. 12, PF1 corresponds to the profile of the first platform 10. PF2 corresponds to the profile of the second platform 30.

FIG. 13 illustrates conversion information stored in the name matching dictionary database 55. As illustrated in FIG. 13, even if object names or the attribute names are different from each other, they are defined as a single group because data meanings are identical. For example, although different object names are added to "obj-1-1", "obj-2-2" and "obj-N-g", data meanings of them are identical. Although different attribute names are added to "att-2-3-4" and "att-3-5-1", data meanings of them are identical.

FIG. 14 illustrates conversion information enrolled in the difference dictionary database 56. As illustrated in FIG. 14, the difference dictionary database 56 stores examples of data conversion. For example, when an object "obj-1-2" is a union composed of an object "obj-2-3" and an object "obj-2-5", "obj-1-2"="obj-2-3"+"obj-2-5" is enrolled. "att-1-3-2"="att-2-5-2"="at-2-5-1" is enrolled, when an attribute "att-1-3-2" is defined as a work time, an attribute "att-2-5-1" is a start time or a work and an attribute "att-2-5-2" is an end time or a work. "att-1-5-6"=Σ(("att-2-10-1"< >" ")*"att-2-10-3") is enrolled as a designated period, when an attribute "att-1-5-6" is defined as an accumulated usage time of a facility within a designated period, an attribute "att-2-10-2" is a day for using the facility, and an attribute "att-2-10-3" is defined as a usage time of the facility.

Figure 15:
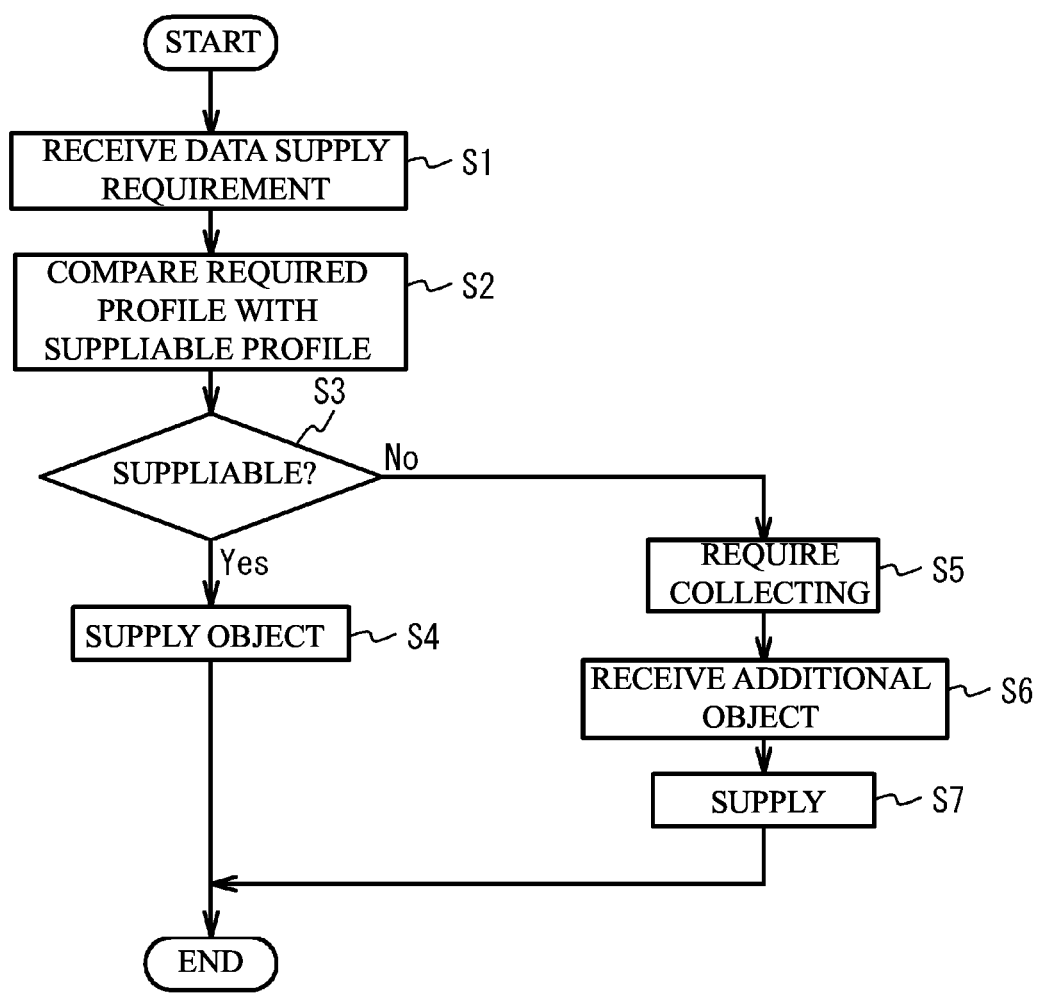

FIG. 15 illustrates a flowchart of operations of the platform system 100 in a case where the first platform 10 of the platform system 100 receives a data supply requirement from an application or the like. As illustrated in FIG. 15, the profile browser 12 receives a data supply requirement from the application or the like (Step S1). The data supply requirement includes a definition of a data group (profile) which the application needs for processes.

Next, the profile browser 12 compares the profile required in Step S1 with a profile which the profile browser 12 can supply, with an object level and an attribute level (Step S2). Next, the profile browser 12 determines whether the profile browser 12 can supply the profile required by the application (Step S3). When the profile required by the application is the same as the profile which the profile browser 12 can supply, it is determined that the profile browser 12 can supply the profile.

When it is determined as "Yes" in Step S3, the data supplier 13 collects objects from the first database 20 and supplies the collected objects to the application (Step S4). After that, the flowchart is terminated. When it is determined as "No" in Step S3, the profile browser 12 asks the data convertor 50 to collect an additional object (Step S5).

Next, the first platform 10 receives an additional object from the data convertor 50 (Step S6). Next, the data supplier 13 collects objects from the first database 20, adds the additional object received in Step S6 to the objects and supplies the objects and the additional object to the application (Step S7). Then, the flowchart is terminated.

Figure 16:
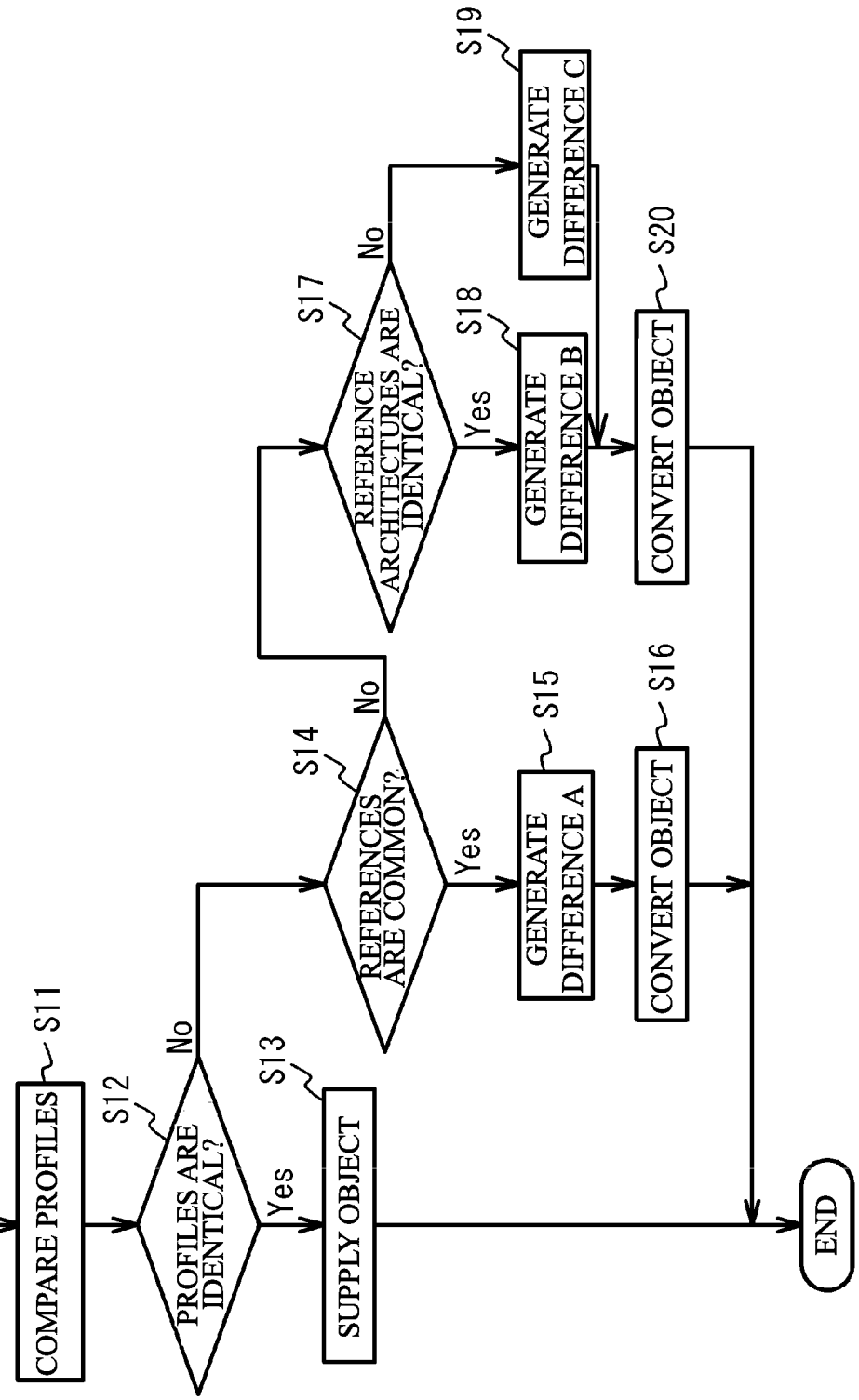
FIG. 16 illustrates a flowchart which is executed when a data convertor performs data conversion.

FIG. 16 illustrates a flowchart which is executed when the data convertor 50 performs data conversion. The flowchart of FIG. 16 is executed when the data convertor 50 receives a requirement of collecting of an additional object from the profile browser 12 of the first platform 10. As illustrated in FIG. 16, the data convertor 50 compares the profile of the first platform 10 with the profile of the second platform 30 (Step S11).

Figure 17:
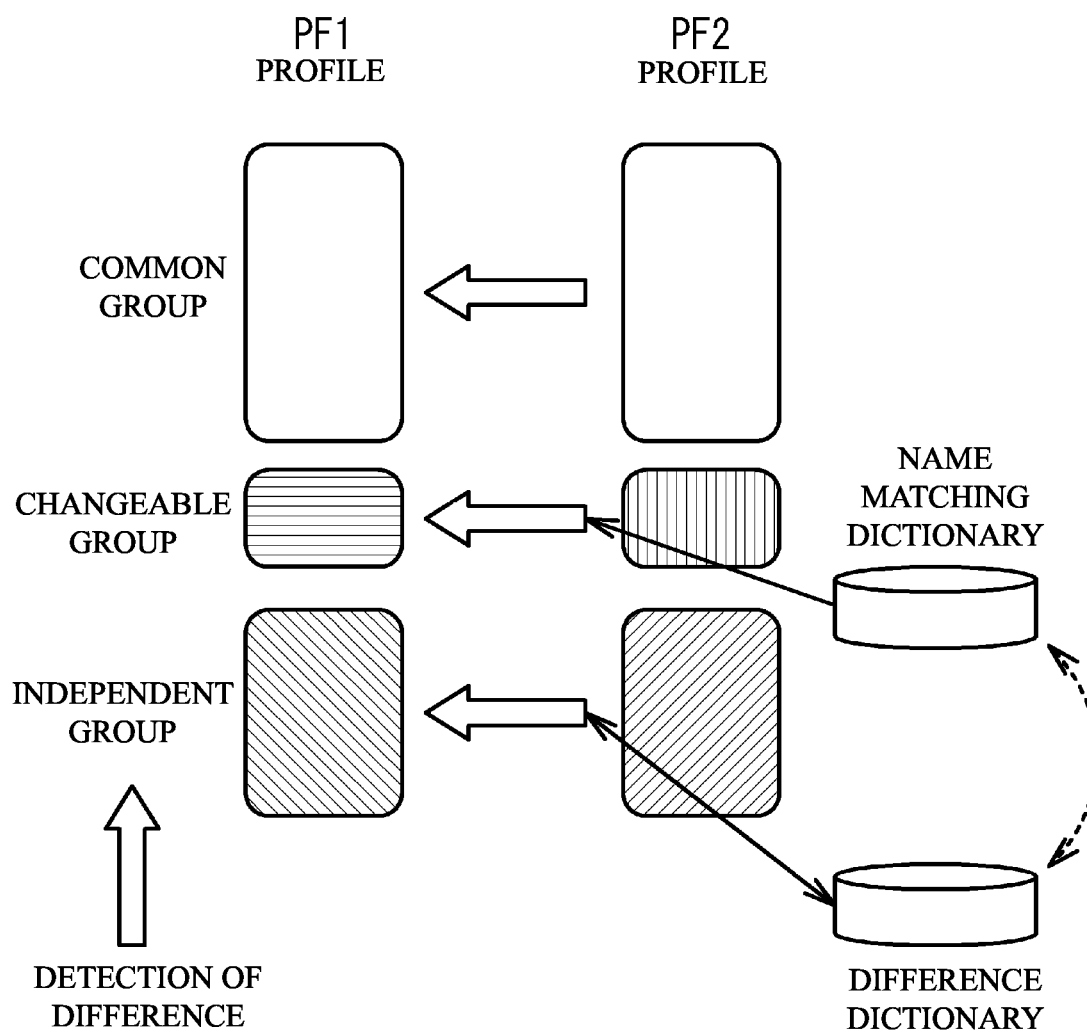
FIG. 17 illustrates an outline of Step S11.

FIG. 17 illustrates an outline of Step S11. As illustrated in FIG. 17, the data convertor 50 browses profiles and objects supplied by the platform, the reference platform and the reference architecture, and performs a searching with use of object names, attribute names, and data types as a key. Thus, the data convertor 50 classifies objects and attributes into a group of common objects and common attributes (hereinafter referred to as a common group), a group of changeable objects and changeable attributes (hereinafter referred to as a changeable group) and a group of objects and attributes which the first platform 10 and the second platform 30 independently have (hereinafter referred to as an independent group). In this case, with respect to extracting of the changeable group, the name matching dictionary may be browsed. Moreover, with respect to the objects of the independent group, the conversion is performed by an instruction of a platform operator. The sequential processes are called a difference extraction/conversion.

Figure 18:
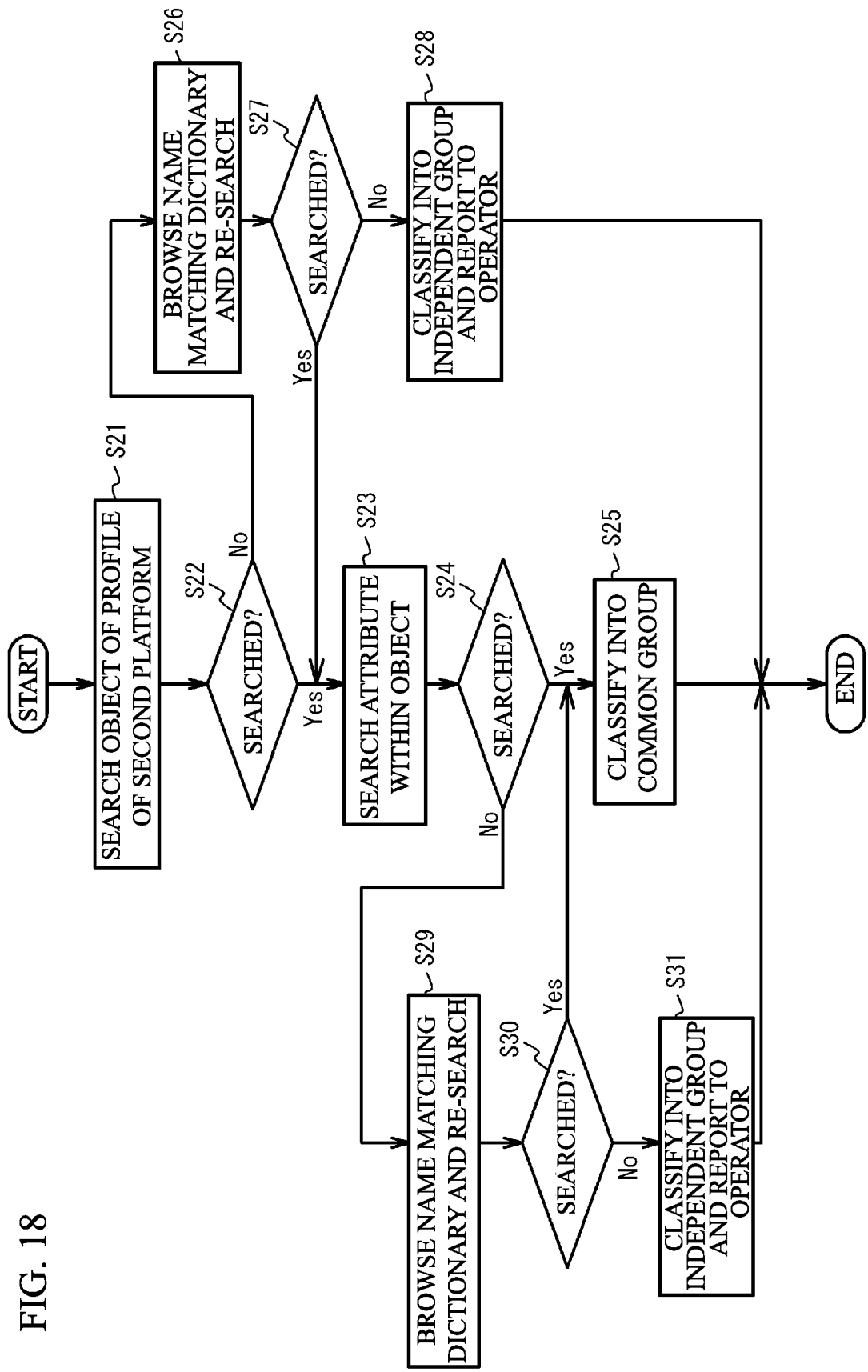
FIG. 18 illustrates a flowchart of details of Step S11.

FIG. 18 illustrates a flowchart of details of Step S11. As illustrated in FIG. 18, the conversion definer 53 extracts a first object from the profile of the first platform 10, and searches an object level of the profile of the second platform 30 by using an object name as a key (Step S21).

Next, the conversion definer 53 determines whether a corresponding object is searched (Step S22). When it is determined as "Yes" in Step S22, the conversion definer 53 searches an attribute level of the corresponding object by using an attribute name as a key, with respect to a first attribute of the first object (Step S23). Next, the conversion definer 53 determines whether all attributes are researched in the first object (Step S24). When it is determined as "Yes" in Step S24, the conversion definer 53 classifies the first object to the common group (Step S25). Then, the flowchart is terminated.

When it is determined as "No" in Step S22, the conversion definer 53 browses the name matching dictionary database 55, changes the object name of the second platform 30 with use of the name matching dictionary, and researches a corresponding object again (Step S26). Next, the data convertor 50 determines whether the corresponding object is researched (Step S27). When it is determined as "Yes" in Step S27, Step S23 is executed. When it is determined as "No" in Step S27, the conversion definer 53 classifies the object into an independent group and outputs information indicating that there is no collection dictionary corresponding to the difference (Step S28). After that, the flowchart is terminated.

When it is determined as "No" in Step S24, the conversion definer 53 browses the name matching dictionary database 55, changes the attribute name of the second platform 30 with use of the name matching dictionary and researches a corresponding attribute again (Step S29). Next, the conversion definer 53 determines whether the corresponding attribute is researched (Step S30). When it is determined as "Yes" in Step S30, Step S25 is executed. When it is determined as "No" in Step S30, the conversion definer 53 classifies the attribute into the independent group and outputs information indicating that there is no name matching dictionary corresponding to the difference (Step S31). Then, the flowchart is terminated.

The operator reviews the profile of the second platform 30 on the basis of the report, and defines the conversion rule for conversion to the profile of the first platform 10. Alternatively, the operator defines that the corresponding object is an empty space. The operator registers the definition in the difference dictionary database 56 as conversion information. A changing process within the defined conversion rules may be added to the name matching dictionary. The operator defines the conversion rule or an empty space viewed from the second platform 30 side.

Step S21 to Step S31 are repeated with respect to all objects of the first platform 10. When there is no remaining object in the profile of the second platform 30, the flowchart is terminated.

As illustrated in FIG. 16, after Step S11, the convertor 57 determines whether the second platform 30 can supply the profile which the first platform 10 requires the second platform 30 (Step S12). When it is determined as "Yes" in Step S12, the convertor 57 sends the additional object to the first platform 10 (Step S13). Then, the flowchart is terminated.

When it is determined as "No" in Step S12, the convertor 57 determines whether the reference platform which the first platform 10 browses is the same as the reference platform which the second platform 30 browses (Step S14). When it is determined as "Yes" in Step S14, the convertor 57 generates the difference A described in FIG. 8 (Step S15). Next, the convertor 57 browses the name matching dictionary database 55 or the difference dictionary database 56, performs data conversion, and sends the converted object to the first platform 10 (Step S16). Then, the flowchart is terminated.

When it is determined as "No" in Step S14, the convertor 57 determines whether the reference architecture browsed by the first platform 10 is the same as the reference architecture browsed by the second platform 30 (Step S17). When it is determined as "Yes" in Step S17, the convertor 57 generates the difference B described in FIG. 9 (Step S18). When it is determined as "No" in Step S17, the convertor 57 generates the difference C described in FIG. 10 (Step S19). After execution of Step S18 or Step S19, the convertor 57 browses the name matching dictionary database 55 or the difference dictionary database 56, performs data conversion, and sends the converted object to the first platform 10 (Step S20). Then, the flowchart is terminated.

In the embodiment, when the second platform 30 is required to receive an object by the first platform 10, the data structure of the required object is converted into a data structure which the first platform 10 requires, in accordance with a difference between the data structure regulated by the first platform 10 and the data structure regulated by the second platform 30. Thus, it is possible to convert data structures between platforms.

The first platform 10 or the second platform 30 may include the data convertor 50. Alternatively, the data convertor 50 may be included in a third platform that is independent of the first platform 10 and the second platform 30.

Figure 19:
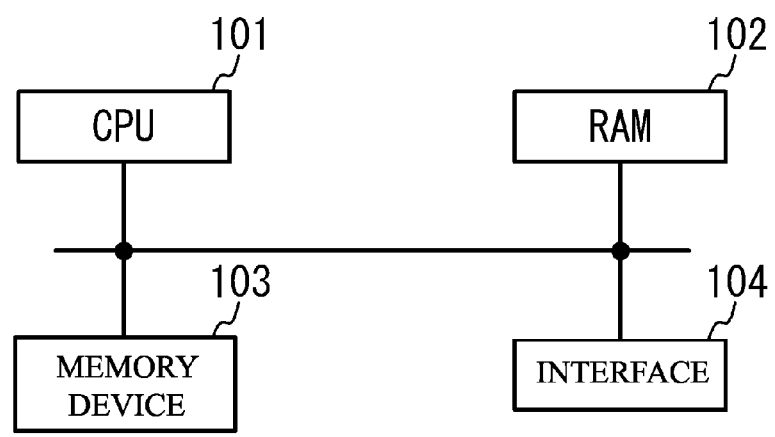
FIG. 19 illustrates a block diagram of a hardware structure of a platform system.

FIG. 19 illustrates a block diagram of a hardware structure of the platform system 100. As illustrated in FIG. 19, the platform system 100 has a CPU 101, a RAM 102, a memory device 103, an interface 104 and so on. These components are coupled to each other with a bus or the like. The CPU 101 is a central processing unit. The CPU 101 includes one or more core. The RAM (Random Access Memory) 102 is a volatile memory temporally storing a program executed by the CPU 101, a data processed by the CPU 101, and so on. The memory device 103 is a nonvolatile memory device. The memory device 103 may be a SSD (Solid State Drive) such as a ROM (Read Only Memory) or a flash memory, or a hard disk driven by a hard disk drive. The interface 104 is an interface of an electrical communication line or the like. The CPU 101 executes a program stored in the memory device 103. Thus, each unit of the platform system 100 is established. Alternatively, a plurality of terminals may have the structure of FIG. 19, and one or more platforms may be established in each of the terminals. In this case, the data convertor 50 may be included in any one of the platforms. The data convertor 50 may be established in another terminal. Alternatively, each unit of the platform system 100 may be a hardware such as a dedicated circuit.

In the above-mentioned embodiments, the first platform 10 acts as an example of a first platform configured to output one or more data from data which the first platform has. The second platform 30 acts as an example of a second platform configured to output one or more data from data which the second platform has. The data convertor 50 acts as an example of a data convertor configured to receive data from the second platform when the first platform requires the second platform to send the data, convert a data structure of the data into a data structure required by the first platform in accordance with a difference between a data structure regulated by the first platform and a data structure regulated by the second platform, and send the data, of which the data structure is converted, to the first platform. The reference platform acts as an example of a virtual platform. The reference architecture acts as an example of a higher virtual platform.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A platform system comprising:
a memory; and
a processor coupled to the memory and the processor configured to execute a process, the process comprising:
receiving data from a second platform when a first platform requires the second platform to send the data, the first platform being configured to output one or more data from data which the first platform has, the second platform being configured to output one or more data from data which the second platform has; and
converting a data structure of the data into a data structure required by the first platform in accordance with a difference between a data structure regulated by the first platform and a data structure regulated by the second platform; and
sending the data, of which the data structure is converted, to the first platform,
wherein the difference is generated by comparing the data structure regulated by the first platform, the data structure regulated by the second platform and a data structure of a virtual platform which is browsed when constructing the first Platform and the second platform,
wherein when the first platform and the second platform are constructed by browsing different virtual platforms, the difference is generated in accordance with a data structure of a virtual platform higher than the different virtual platforms,
wherein the data structure of the required data is converted, with use of conversion information corresponding to the difference within conversion information enrolled in advance.

2. The platform system as claimed in claim 1, wherein information indicating that there is no conversion information is output, when there is no conversion information corresponding to the difference.

3. The platform system as claimed in claim 1, wherein when the first platform receives a data supply requirement from an application, the first platform requires the second platform to supply data that lacks with respect to the data supply requirement.

4. A data conversion method causing a computer to execute a process, the process comprising:
receiving data from a second platform when a first platform requires the second platform to send the data, the first platform being configured to output one or more data from data which the first platform has, the second platform being configured to output one or more data from data which the second platform has; and
converting a data structure of the data into a data structure required by the first platform in accordance with a difference between a data structure regulated by the first platform and a data structure regulated by the second platform; and
sending the data, of which the data structure is converted, to the first platform,
wherein the difference is generated by comparing the data structure regulated by the first platform, the data structure regulated by the second platform and a data structure of a virtual platform which is browsed when constructing the first platform and the second platform,
wherein when the first platform and the second platform are constructed by browsing different virtual platforms, the difference is generated in accordance with a data structure of a virtual platform higher than the different virtual platforms,
wherein the data structure of the required data is converted, with use of conversion information corresponding to the difference within conversion information enrolled in advance.

5. The data conversion method as claimed in claim 4, wherein information indicating that there is no conversion information is output, when there is no conversion information corresponding to the difference.

6. The data conversion method as claimed in claim 4, wherein when the first platform receives a data supply requirement from an application, the first platform requires the second platform to supply data that lacks with respect to the data supply requirement.

7. A computer-readable, non-transitory medium storing a program that causes a computer to execute a process, the process comprising:
receiving data from a second platform when a first platform requires the second platform to send the data, the first platform being configured to output one or more data from data which the first platform has, the second platform being configured to output one or more data from data which the second platform has; and
converting a data structure of the data into a data structure required by the first platform in accordance with a difference between a data structure regulated by the first platform and a data structure regulated by the second platform; and sending the data, of which the data structure is converted, to the first platform,
wherein the difference is generated by comparing the data structure regulated by the first platform, the data structure regulated by the second platform and a data structure of a virtual platform which is browsed when constructing the first platform and the second platform,
wherein when the first platform and the second platform are constructed by browsing different virtual platforms, the difference is generated in accordance with a data structure of a virtual platform higher than the different virtual platforms,
wherein the data structure of the required data is converted, with use of conversion information corresponding to the difference within conversion information enrolled in advance.

8. The medium as claimed in claim 7, wherein information indicating that there is no conversion information is output, when there is no conversion information corresponding to the difference.

9. The medium as claimed in claim 7, wherein when the first platform receives a data supply requirement from an application, the first platform requires the second platform to supply data that lacks with respect to the data supply requirement.

* * * * *